US008576546B2

(12) United States Patent
Cutler et al.

(10) Patent No.: US 8,576,546 B2
(45) Date of Patent: Nov. 5, 2013

(54) FUSE ISOLATION SWITCH

(75) Inventors: Seth Adam Cutler, Bridgeport, CT (US); Gary Paul Michaelis, Oakville, CT (US)

(73) Assignee: General Electric Company, Schenectady, NY (US)

(*) Notice: Subject to any disclaimer, the term of this patent is extended or adjusted under 35 U.S.C. 154(b) by 278 days.

(21) Appl. No.: 13/225,974

(22) Filed: Sep. 6, 2011

(65) Prior Publication Data

US 2013/0058013 A1 Mar. 7, 2013

(51) Int. Cl.
*H02B 1/26* (2006.01)

(52) U.S. Cl.
USPC ............ 361/626; 361/628; 361/630; 361/642

(58) Field of Classification Search
None
See application file for complete search history.

(56) References Cited

U.S. PATENT DOCUMENTS

| | | | | |
|---|---|---|---|---|
| 3,335,380 | A * | 8/1967 | Gramlich et al. | 336/90 |
| 3,621,339 | A * | 11/1971 | Hodgson | 361/678 |
| 4,827,374 | A * | 5/1989 | Dunn | 361/617 |
| 5,001,600 | A * | 3/1991 | Benson | 361/610 |
| 5,734,207 | A | 3/1998 | LeCourt | |
| 6,992,256 | B1 | 1/2006 | Wiley et al. | |
| 6,998,954 | B2 * | 2/2006 | Milanczak | 337/194 |
| 7,824,191 | B1 | 11/2010 | Browder | |
| 2006/0012350 | A1 | 1/2006 | Fey | |
| 2008/0211264 | A1 * | 9/2008 | Riess et al. | 296/193.01 |
| 2010/0043863 | A1 | 2/2010 | Wudu et al. | |

OTHER PUBLICATIONS

Clearwater Tech, "ABB solutions for photovoltaics Protection and other modular devices," pp. 1-18.
Cooper Bussmann, "Photovoltaic (PV) Systems," 2005, pp. 1-2.
Moeller GmbH, "Protecting and Disconnecting in Photovoltaic Systems," pp. 1-12.
Oez s.r.o., "Protective and switching devices of photovoltaic sources," 2010, pp. 1-20.
Siba, "Professional protection for professional photovoltaic systems SIBA fuses for solar energy systems," pp. 1-8.

* cited by examiner

*Primary Examiner* — Gregory Thompson
(74) *Attorney, Agent, or Firm* — Cantor Colburn LLP

(57) ABSTRACT

An apparatus includes a housing portion comprising a back panel, side panels, and a front panel, the back panel and side panels partially defining a cavity having an access orifice, the side panels partially defining an entry area to the access orifice, the front panel arranged to at least partially obscure the entry area to the access orifice and pivot about an axis of rotation, and a first switch disposed in the cavity including a first contact portion secured to the housing portion, and a removable contact portion connected to the front panel.

20 Claims, 7 Drawing Sheets

FUSE ISOLATION SWITCH

BACKGROUND OF THE INVENTION

The subject matter disclosed herein relates to fuses, and particularly to a switch box arrangement that includes fuses.

Traditional alternating current (AC) switch boxes often include an array of switches and fuses that correspond to each phase of a multi-phase electrical distribution system. The switches are arranged to disconnect the line side of the fuses from the incoming voltage of a respective phase.

The switch boxes often include an external lever that is mechanically linked to the switches such that actuating the external lever opens and closes the switches. In operation, a technician operates the external lever to open the switches, thereby isolating the fuses prior to opening an access panel or door that exposes the fuse and switches for maintenance or troubleshooting.

In some electrical systems, such as systems that receive electrical power from an electrical grid and electrical power from an on-site power source, a voltage may be present in the fuses if the fuses are not completely electrically isolated from the system. It is desirable to ensure that a technician has isolated the fuses from the system prior to accessing the switch box.

BRIEF DESCRIPTION OF THE INVENTION

According to one aspect of the invention an apparatus includes a housing portion comprising a back panel, side panels, and a front panel, the back panel and side panels partially defining a cavity having an access orifice, the side panels partially defining an entry area to the access orifice, the front panel arranged to at least partially obscure the entry area to the access orifice and pivot about an axis of rotation, and a first switch disposed in the cavity including a first contact portion secured to the housing portion, and a removable contact portion connected to the front panel.

According to one aspect of the invention a system includes a power source, and an apparatus comprising a housing portion comprising a back panel, side panels, and a front panel, the back panel and side panels partially defining a cavity having an access orifice, the side panels partially defining an entry area to the access orifice, the front panel arranged to at least partially obscure the entry area to the access orifice and pivot about an axis of rotation, and a first switch disposed in the cavity including a first contact portion secured to the housing portion, and a removable contact portion connected to the front panel, the first switch is electrically connected to the power source.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
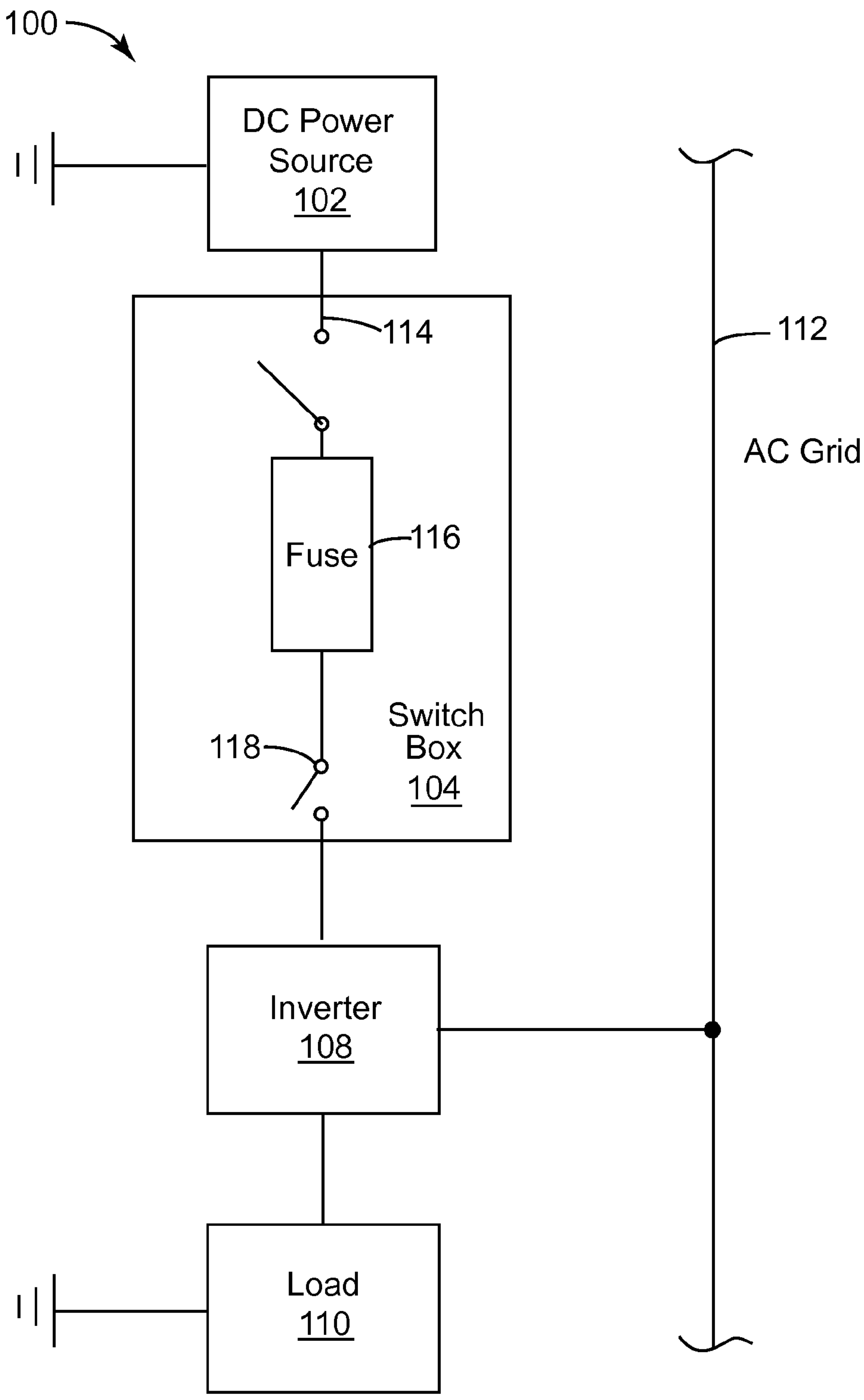
FIG. 1 illustrates a block diagram of an exemplary embodiment of an electrical system, in accordance with an embodiment of the invention.

FIG. 1 illustrates a one-line block diagram of an exemplary embodiment of an electrical system (system) 100. The system 100 includes a direct current (DC) power source 102 that may include, for example, an array of solar cells, a wind turbine, or other type of generator or power source. A switch box 104 is electrically connected to the DC power source 102 and an inverter 108. The inverter 108 is operative to invert DC power into AC power. The inverter 108 is electrically connected to an electrical load 110, such as, for example, electrical equipment including motors, lighting, and heating and air conditioning systems, and an AC grid 112. While the system 100 is depicted in FIG. 1 as a one-line block diagram, it will be appreciated by one skilled in the art that such a depiction also represents a multi-phase electrical distribution system, such as a three-phase or three-phase with switching neutral electrical system, for example.

The switch box 104 includes a fuse 116 that may include any type of fuse such as, for example, a photovoltaic (PV) fuse that is electrically connected to the DC power source 102 and the inverter 108. The switch box 104 includes a first switch 114 that is electrically connected to the fuse 116 and the DC power source 102. The arrangement of the first switch 114 allows the fuse 116 to be electrically isolated from the DC power source 102 when the first switch 114 is in an open position or state. A second switch 118 is electrically connected to the fuse 116 and the inverter 108. The arrangement of the second switch allows the fuse 116 to be electrically isolated from the inverter 108 when the second switch 218 is in an open position or state. The first switch 114 may be mechanically linked to an actuating linkage (not shown in FIG. 1) with an external lever that allows a technician to manually open or close the first switch 114 using a single lever prior to accessing the switch box 104.

The second switch 118 is a pull-out disconnect switch having biased contacts secured to a housing that is connected to the switch box 104 and a removable contact that when positioned between and in contact with the biased contacts defines a current path through the biased contacts and the removable contact.

The electrical connection between the inverter 108 and the AC grid 112, and in some instances, the connection between the inverter and the load 110, may result in a "back feeding" state where a voltage may be present at the fuse 116 even if the fuse 116 is isolated from the DC power source 102 (i.e., the switch 114 is in an open position or state). The second switch 118 allows the fuse 116 to be isolated from the inverter 108. The combination of the first switch 114 and the second switch

118 allows the fuse 116 to be isolated from both the DC power source 102 and the inverter 108 when the first switch 114 and the second switch 118 are in an open position or state.

Previous examples of switch boxes included labels that would remind a technician to test the fuses with a volt meter to ensure that there is no voltage present at the fuse 116 prior to accessing the fuse 116. The embodiments described below improve the safety of the switch boxes by electrically isolating the fuse 116 by opening both the first switch 114 and the second switch 118. The switch boxes may include an arrangement such that an access panel or door is mechanically prevented from being opened prior to opening the first switch 114 and the second switch 118.

Figure 2:
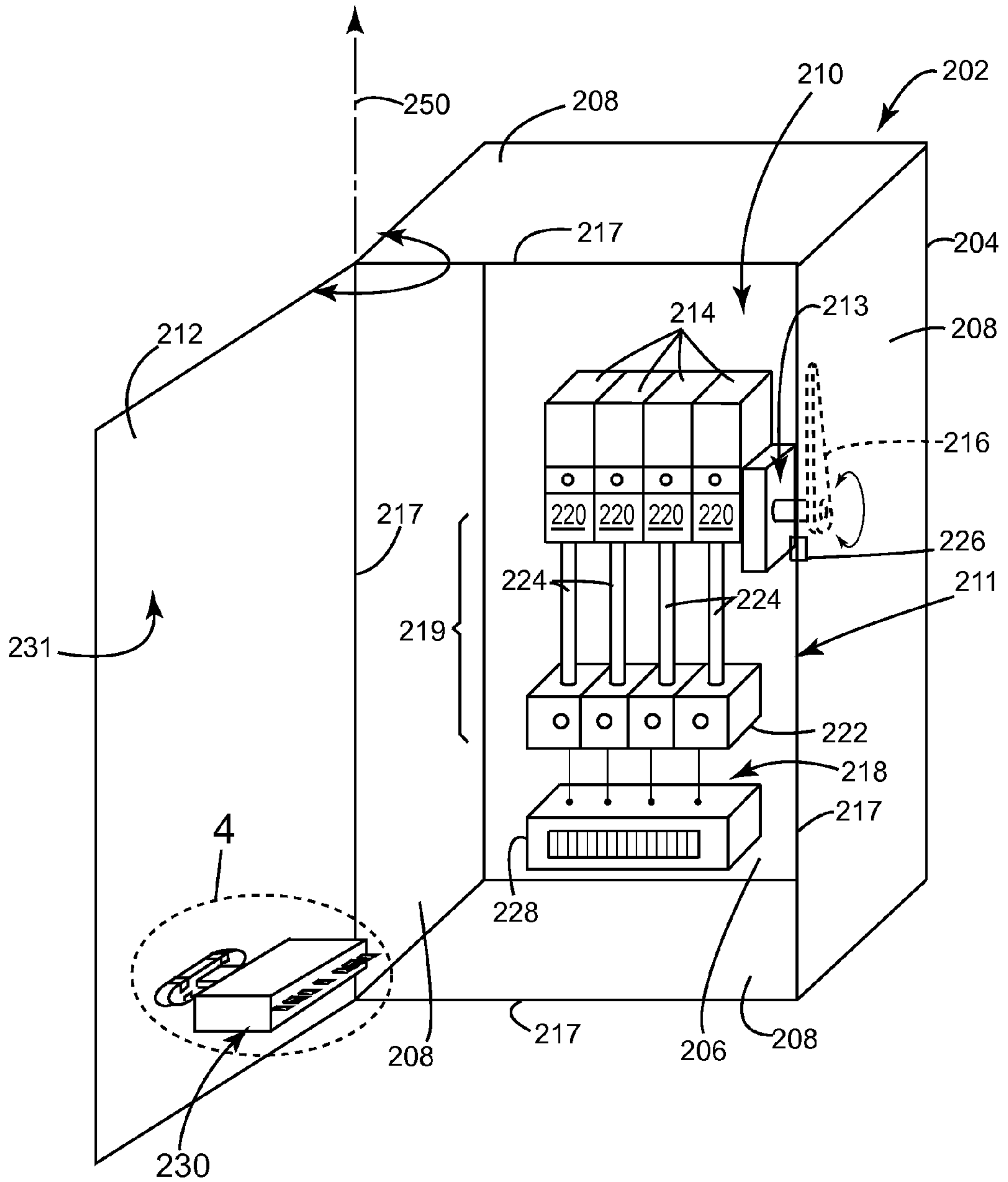
FIG. 2 illustrates an exemplary embodiment of a switch box, in accordance with an embodiment of the invention.

In this regard, FIG. 2 illustrates an exemplary embodiment of a switch box (connection box) 202. The switch box 202 is arranged to be used in a multi-phase power system. Though the switch box 202 of the illustrated embodiment is arranged to be used in a three-phase power system, alternate embodiments may include similar arrangements that may be used in, for example, a single-phase power system or a multi-phase power system having any number of phases.

The switch box 202 includes a housing portion 204 having a rear panel 206, and side panels 208 that define a cavity 210 having an access orifice 211 defined by exposed edges 217 of the side panels 208, the housing portion 204 includes a front panel 212 that encloses the cavity 210 and the access orifice 211 when arranged in a closed position. The front panel 212 may be secured to the side panels 208 of the housing portion with, for example, fasteners, a hinge arrangement, a combination of a hinge arrangement and fasteners, or any suitable combination of hooks, clasps, or clips. Switches 214 and 118 are arranged in the cavity 210. The switch 214 is connected to an actuating lever 216 with a mechanical linkage arrangement 213 such that the movement of the actuating lever 216 changes the position or state of the switch 214. The mechanical linkage arrangement 213 or the actuating lever 216 may include an interlock assembly 226 that interacts with the front panel 212, and prevents the front panel 212 from being opened (exposing the cavity 210) unless the actuating lever 216 is in a position that places the switch 214 in an open state or position. Thus, an operator may be prevented from opening or removing the front panel 212 prior to placing the switch 214 in an open state or position. Each of the switches 214 and 218 includes a terminal that may be connected to an electrical cable or line. The switches 214 and 218 are electrically connected to corresponding fuse holder assemblies 219. Each of the fuse holder assemblies 219 includes a first fuse holder portion 220 and a second fuse holder portion 222. The first fuse holder portion 220 secures a first end of a fuse 224 and is electrically connected to a corresponding switch 214. The second fuse holder portion 222 secures a second end of the fuse 224 and is electrically connected to a terminal that is electrically connected to the second switch 218. An electrical path is defined by the terminals of a switch 214, the switch 214 contacts, the first fuse holder portion 220, the fuse 224, the second fuse holder portion 222, terminals of the second fuse holder portion 222, the second switch 218 stationary contacts, the second switch 218 removable contacts, and the terminals of the second switch 218.

The second switch 218 is connected to the housing portion 204. The second switch 218 includes a stationary contact portion 228 and a removable contact member 230. The stationary contact portion 228 that includes pairs of biased conductive contacts that are secured to the stationary contact portion 228.

Figure 3:
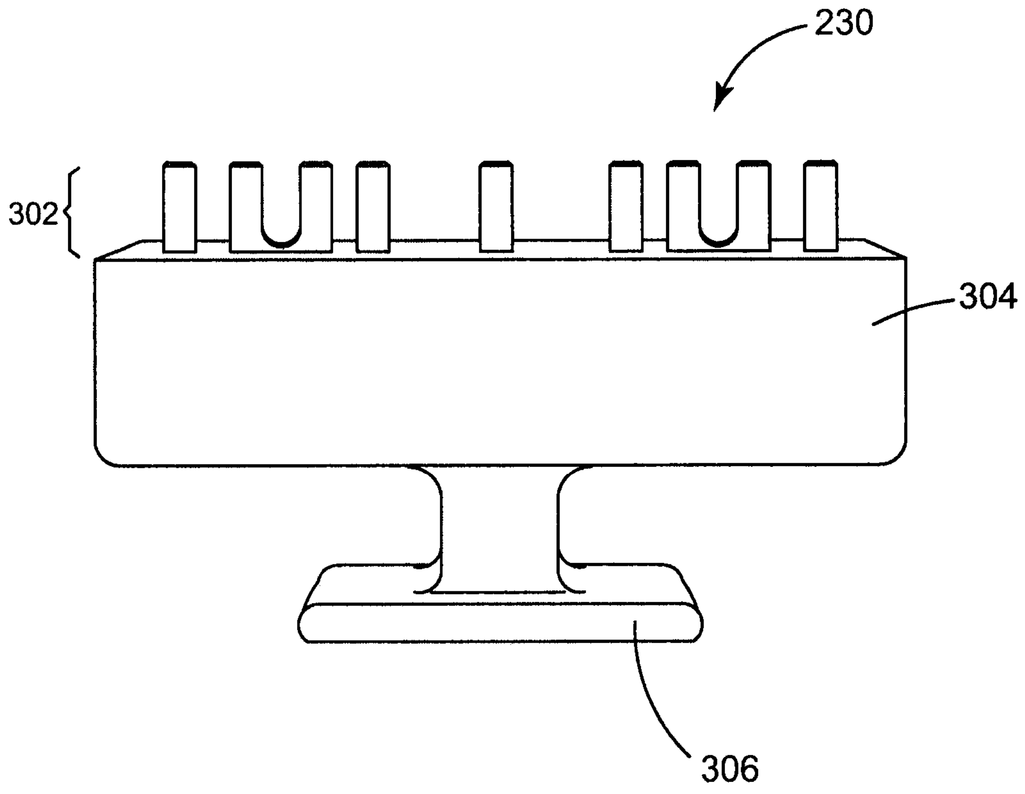
FIG. 3 illustrates an exemplary embodiment of a removable contact member in accordance with an embodiment of the invention.

FIG. 3 illustrates an exemplary embodiment of a removable contact member 230 that includes conductive contacts 302, a housing portion 304, and a handle portion 306.

Figure 4:
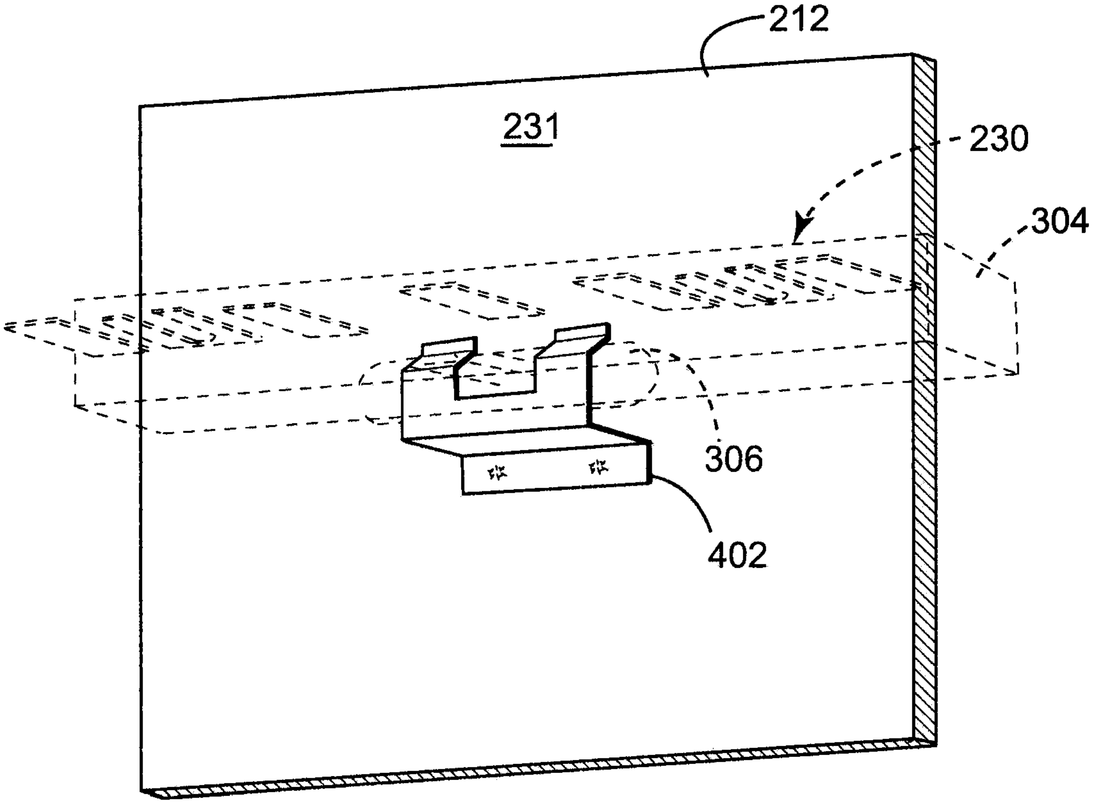
FIG. 4 illustrates a detailed, partially transparent view of the region 4 of FIG. 2.

FIG. 4 illustrates a detailed, partially transparent view of the region 4 (of FIG. 2). In this regard, the removable contact member 230 is illustrated engaging a retaining member 402 that is connected to an inner surface 231 of the front panel 212. The retaining member 402 in the illustrated embodiment includes a metallic clip that may be formed from stamped or bent sheet metal material and connected to the inner surface 231 of the front panel with, for example, fasteners or another joining means such as welding or brazing. The retaining member 402 is not limited to the embodiment shown, and may include any type of clip, fastener, bracket, or retaining arrangement that engages and retains the removable contact member 230. In the illustrated embodiment, the retaining member 402 is operative to engage the handle portion 306 of the removable contact member 230, however alternate embodiments may be operative to engage and retain portions of the housing portion 304.

Figure 5:
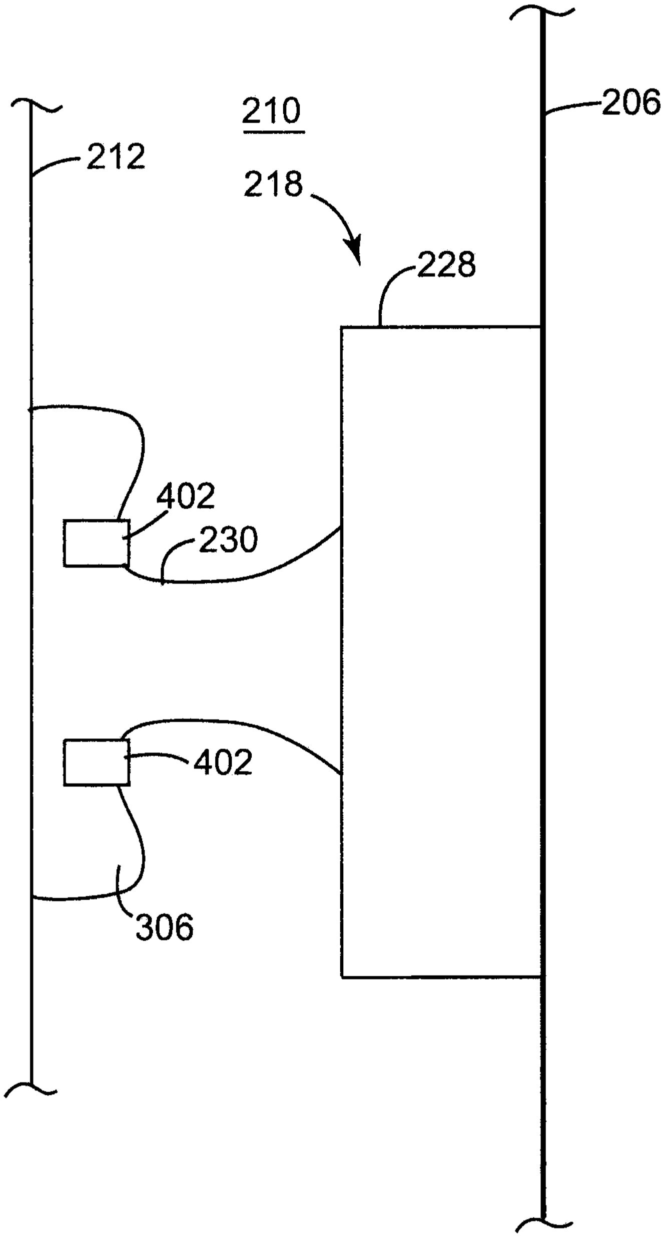
FIG. 5 illustrates a top partially cut-away view of the exemplary embodiment in accordance with an embodiment of the invention.

FIG. 5 illustrates a top partially cut-away view of the exemplary embodiment. In this regard, the second switch 218 is shown in a closed state such that the removable contact member 230 is engaging the stationary contact portion 228. The removable contact member 230 is engaging the retaining member 402, and the front panel 212 is closed such that the front panel 212 obscures the cavity 210 and the contents of the cavity 210.

Figure 6:
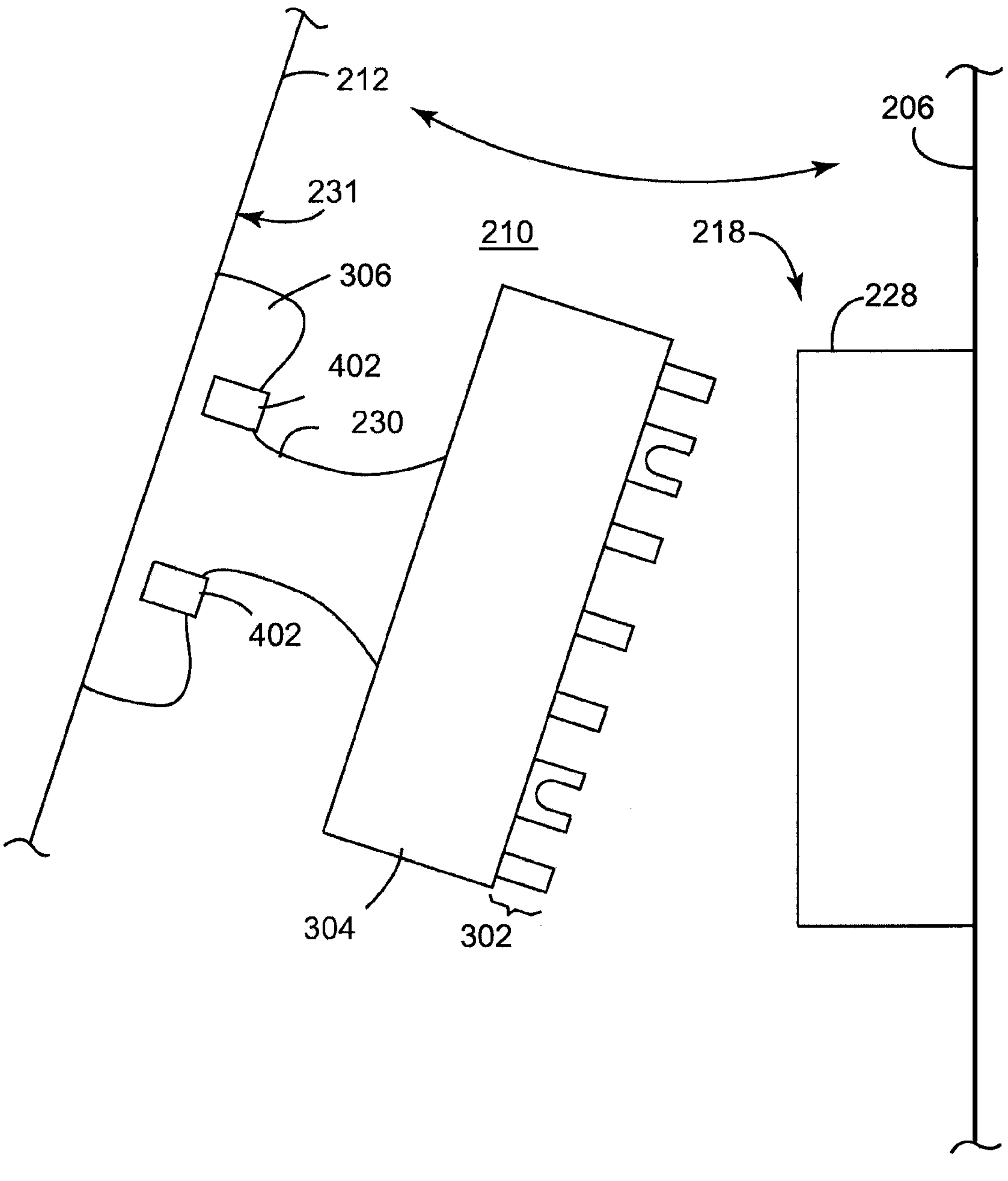
FIG. 6 illustrates another top partially cut-away view of the exemplary embodiment in accordance with an embodiment of the invention.

FIG. 6 illustrates a top partially cut-away view of the exemplary embodiment where the second switch 218 is shown in an open state such that the removable contact member 230 is disengaged from the stationary contact portion 228 as a result of the opening of the front panel 212 by pivoting the front panel 212 about an axis of rotation 250 (illustrated in FIG. 2).

Figure 7:
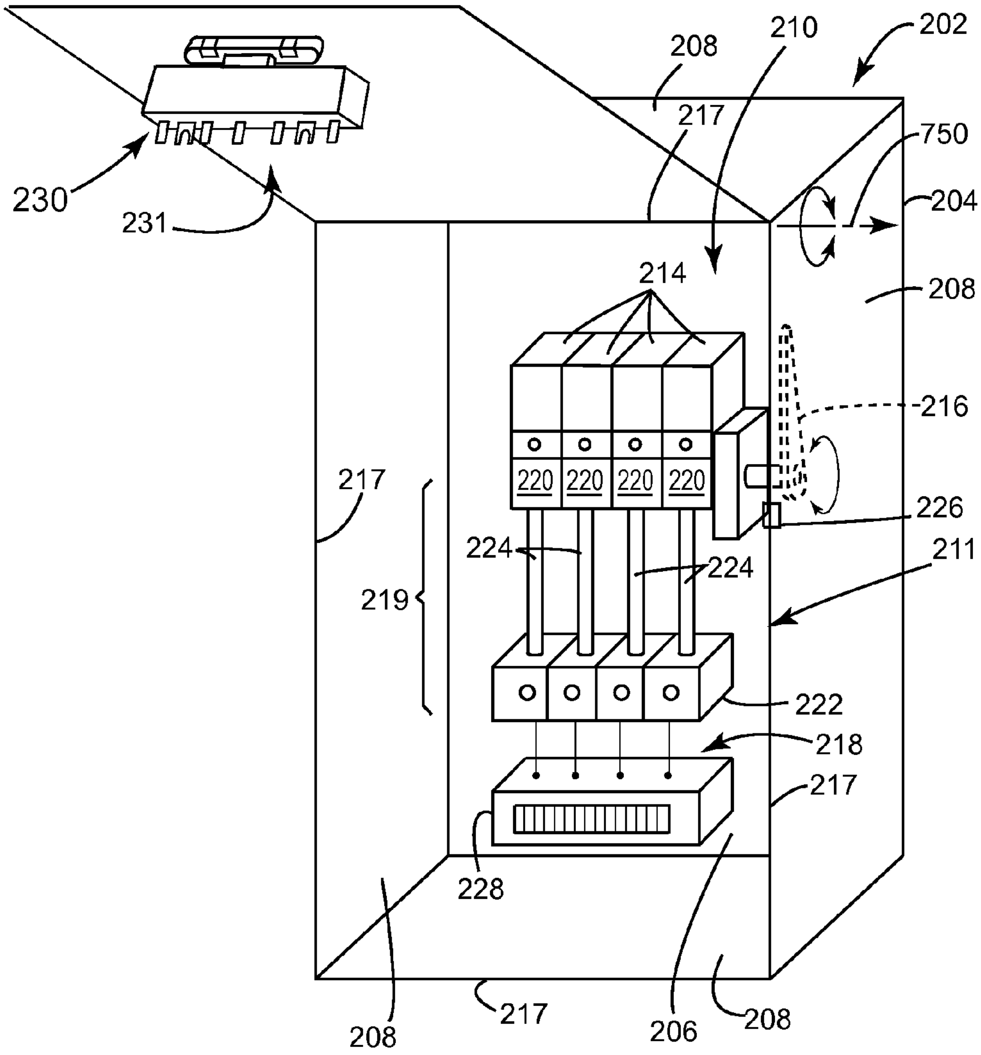
FIG. 7 illustrates an alternate exemplary embodiment of a switch box, in accordance with an embodiment of the invention.

Though the illustrated embodiment shows the front panel 212 pivoting about the axis of rotation 250, alternate embodiments may include a front panel 212 that is connected to another portion of the switch box 202. In this regard, FIG. 7 illustrates an alternate exemplary embodiment that includes the front panel 212 pivoting about the axis of rotation 750 that is arranged substantially parallel to the longitudinal axis of the removable contact member 230.

In an example of operation, an operator may open the first switch 214 by rotating the actuating lever 216 lever to place the first switch 214 into an open position or disconnected state. In some exemplary embodiments, the rotation of the actuating lever 216 may disengage the interlock assembly 226 to allow the movement or displacement of the front panel 212. When the operator opens the front panel 212, the force on the front panel 212 is operative to pull or disengage the removable contact member 230 from the stationary contact portion 228 thus placing the second switch 218 into an open position or disconnected state. The open states of the first switch 214 and the second switch 218 electrically isolate the fuses 224 from the system 100.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An apparatus comprising:

a housing portion comprising a back panel, side panels, and a front panel, the back panel and side panels partially defining a cavity having an access orifice, the side panels partially defining an entry area to the access orifice, the front panel arranged to at least partially obscure the entry area to the access orifice and pivot about an axis of rotation; and a first switch disposed in the cavity including:

a first contact portion secured to the housing portion; and a removable contact portion connected to the front panel.

2. The apparatus of claim 1, further comprising a fuse holder member disposed in the cavity.

3. The apparatus of claim 1, wherein the first contact portion is connected to the back panel.

4. The apparatus of claim 1, wherein the apparatus includes a retaining portion connected to the front panel.

5. The apparatus of claim 4, wherein the removable contact portion is slidably engaged with the retaining portion.

6. The apparatus of claim 1, wherein a planar surface of the front panel is arranged substantially parallel to a planar surface of the back panel.

7. The apparatus of claim 2, further comprising a second switch disposed in the cavity, the second switch electrically connected to a portion of the fuse holder member.

8. The apparatus of claim 7, further comprising an actuation lever linked to the second switch.

9. The apparatus of claim 8, further comprising an interlock assembly linked to the actuation lever and the front panel such that the interlock assembly is operative to retain the front panel when the actuation lever is positioned in a closed position.

10. A system comprising:

a power source; and an apparatus comprising:

a housing portion comprising a back panel, side panels, and a front panel, the back panel and side panels partially defining a cavity having an access orifice, the side panels partially defining an entry area to the access orifice, the front panel arranged to at least partially obscure the entry area to the access orifice and pivot about an axis of rotation; and a first switch disposed in the cavity including:

a first contact portion secured to the housing portion; and a removable contact portion connected to the front panel, the first switch is electrically connected to the power source.

11. The system of claim 10, wherein the apparatus comprises a fuse holder member disposed in the cavity.

12. The system of claim 10, wherein the first contact portion is connected to the back panel.

13. The system of claim 10, wherein the apparatus comprises a retaining portion connected to the front panel.

14. The system of claim 13, wherein the removable contact portion is slidably engaged with the retaining portion.

15. The system of claim 10, wherein a planar surface of the front panel is arranged substantially parallel to a planar surface of the back panel.

16. The system of claim 11, wherein the apparatus comprises a second switch disposed in the cavity, the second switch electrically connected to a portion of the fuse holder member.

17. The system of claim 16, wherein the apparatus comprises an actuation lever linked to the second switch.

18. The system of claim 17, wherein the apparatus comprises an interlock assembly linked to the actuation lever and the front panel such that the interlock assembly is operative to retain the front panel when the actuation lever is positioned in a closed position.

19. The system of claim 10, wherein the power source comprises a direct current power source.

20. The system of claim 10, wherein the system further comprises an inverter electrically connected to the first switch.

* * * * *

UNITED STATES PATENT AND TRADEMARK OFFICE

CERTIFICATE OF CORRECTION

PATENT NO. : 8,576,546 B2
APPLICATION NO. : 13/225974
DATED : November 5, 2013
INVENTOR(S) : Cutler et al.

It is certified that error appears in the above-identified patent and that said Letters Patent is hereby corrected as shown below:

In the Specification

In Column 3, Line 32, delete “214 and 118” and insert -- 214 and 218 --, therefor.

Signed and Sealed this
Twenty-second Day of April, 2014

Michelle K. Lee

Michelle K. Lee
*Deputy Director of the United States Patent and Trademark Office*